(No Model.) 3 Sheets—Sheet 1.
J. S. ROGERS.
APPARATUS FOR PRODUCING GAS FROM HYDROCARBON LIQUIDS.
No. 506,730. Patented Oct. 17, 1893.
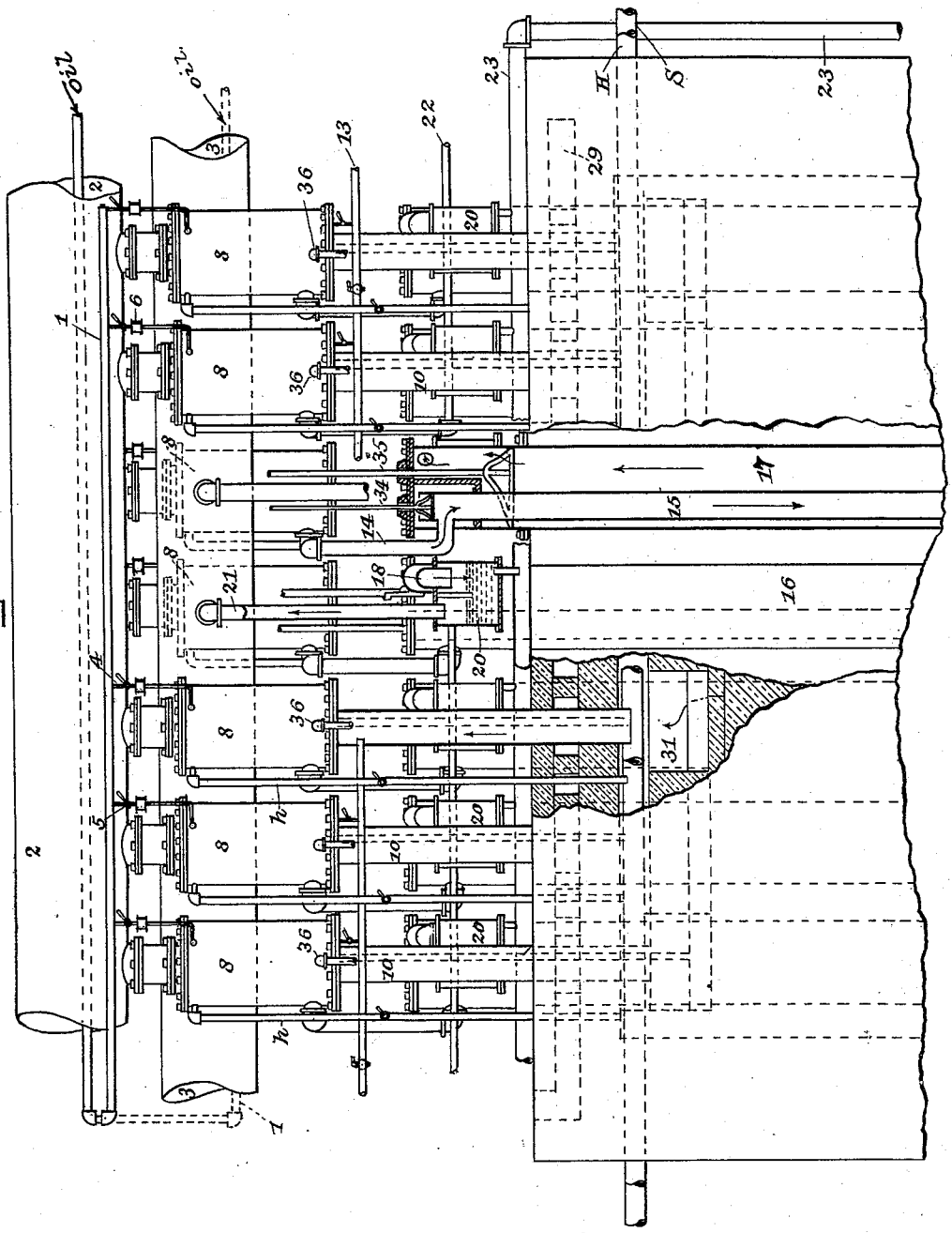
WITNESSES:
E. B. Bolton
Chas. Wirth
INVENTOR:
James S. Rogers,
By W. W. Canfield,
his Attorney.

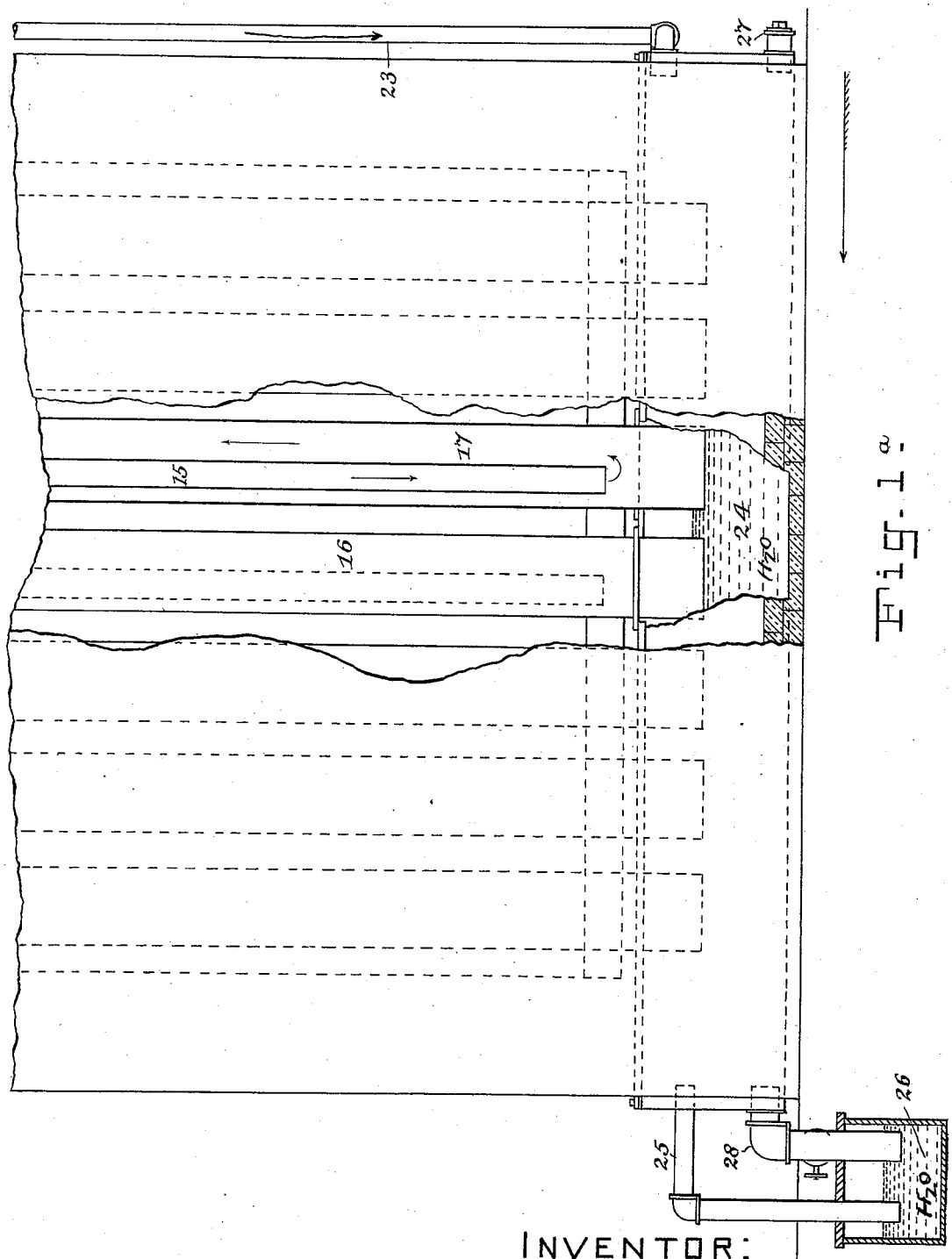

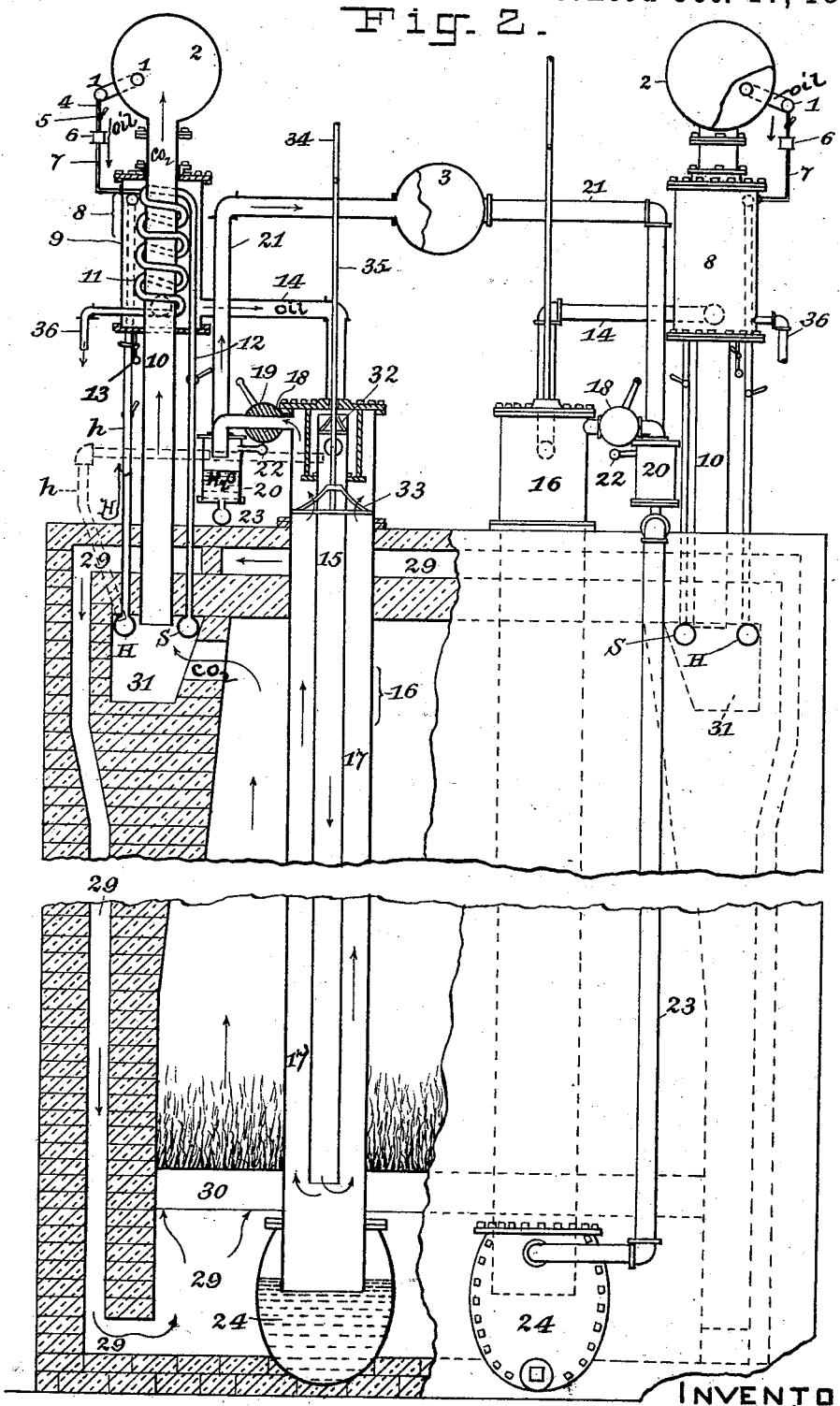

UNITED STATES PATENT OFFICE.

JAMES S. ROGERS, OF SARATOGA SPRINGS, NEW YORK.

APPARATUS FOR PRODUCING GAS FROM HYDROCARBON LIQUIDS.

SPECIFICATION forming part of Letters Patent No. 506,730, dated October 17, 1893.

Application filed December 5, 1892. Serial No. 454,182. (No model.)

*To all whom it may concern:*

Be it known that I, JAMES S. ROGERS, a citizen of the United States, and a resident of Saratoga Springs, in the county of Saratoga and State of New York, have invented certain new and useful Improvements in Apparatus for Producing Gas from Hydrocarbon Liquids, of which the following is a specification, such as will enable those skilled in the art to which it appertains to make and use the same.

This invention relates to the manufacture of heating and illuminating gas from hydrocarbons, or hydrocarbons and hydrogen, and is fully disclosed in the following specification of which the accompanying drawings form a part, wherein similar numerals and letters of reference designate like or equivalent parts wherever found throughout the several views, and in which—

Figure 1, is a side elevation of a part of a furnace provided with my improved apparatus for the manufacture of gas, part of the side walls of the furnace being removed, and portions of the apparatus being broken away, so as to show the interior construction; Fig. 1$^a$, a similar view of the remainder of the furnace, these two figures being intended to show the entire furnace and apparatus; and Fig. 2, is a front elevation of the furnace and apparatus looking in the direction of the arrow shown in Fig. 1$^a$, portions of the apparatus being shown in section.

The object of my invention is to produce a fixed gas of superior quality for heating or illuminating purposes from hydrocarbons and hydrogen, by a simple and economical process, and in an apparatus cheaply constructed, and readily understood and operated, and which may be adapted to furnaces of ordinary construction, or used in connection with an improved form of furnace designed for use in connection with an improved apparatus for the manufacture of gas as shown and described in United States Letters Patent No. 465,077 of December 15, 1891, with slight modifications.

I am aware that many attempts have been made to produce a fixed gas such as I manufacture, from hydrocarbons, or from hydrocarbons and hydrogen, by various processes and apparatus, but, so far as I know, with only partial success. This want of success has resulted principally from defects in the apparatus employed and in the methods pursued, and with the apparatus herein described and claimed, I form the gas from hydrocarbons and hydrogen mingled in any desired proportions, and overcome the defects referred to.

Referring to the drawings, the reference numeral 1, designates a pipe conveying hydrocarbon from a storage tank (not shown) through an escape or smoke flue 2, as shown, or if preferred, through the main gas pipe 3, as shown in dotted lines, thus utilizing the waste heat of the escaping products of combustion, or of the highly heated gas on its passage from the retorts, to raise the hydrocarbon to a degree of heat which materially assists in its vaporization, the escape pipe or flue 2, being in communication with the furnace, and the main gas pipe with the retort, or retorts as hereinafter described. The hydrocarbon being thus heated is conducted through a pipe 4, and a regulating valve 5, through a sight glass 6, which enables the operator to see at all times the flow therethrough, and assists in detecting, instantly, any irregularity in the feed, and then passes through the pipe 7, into the vaporizer 8.

The object of the vaporizer 8, is to vaporize the hydrocarbon rapidly, perfectly and with the greatest economy. It consists of a cylindrical pipe or casing 9, inclosing a pipe or casing 10, the outer casing being closed and the inner one being open at top and bottom. The smaller or inclosed pipe or casing 10, is so arranged as to serve as an escape flue, for a short distance, of the products of combustion, in such a manner as to make a large portion of the heat of such escaping products of combustion available for the purpose of vaporizing the hydrocarbons. Hydrocarbons being admitted into the chamber between the outer and inner casings or pipes, near the top, and preferably against the surface of the inner pipe or casing 10, are more or less fully vaporized according to the degree of heat attained by such pipe. To still further assist in the process of vaporization a pipe 11, preferably of copper or iron is coiled spirally from top to bottom of this inner pipe or casing 10, fitting snugly to the same. Through this pipe 11, is passed superheated steam, taken preferably from one or more steam pipes S, arranged within the smoke flue of the furnace. The waste products of combustion are thus used to superheat the steam, which is conducted from a boiler or other source of supply, through the pipe or pipes thus arranged in the smoke flue. The steam so superheated may be caused to enter the coiled pipe 11, at the top by means of pipe 12, as shown in Fig. 2, or it may, if preferred, be admitted at the bottom and returned for escape, through pipe 36, also at the bottom.

The hydrocarbon in a heated condition passes into the vaporizer at or near the top, as shown, and impinging upon the surface of the inner pipe 10, strikes the steam coil 11, and follows around it, traversing the whole length from top to bottom.

If from any cause, particles of hydrocarbon leave the coil and drop, they are at once caught upon the lower coils of pipe 11, and the result is to vaporize all or nearly all of the hydrocarbon before it reaches the bottom of the chamber. If for any reason a portion of the hydrocarbon is not vaporized it is allowed to run off through pipe 13, at the bottom of the vaporizer, and thence to a tank or other receptacle located at any convenient point to receive it, and this by-product can then be utilized for fuel purposes.

A second pipe H, or series of pipes, in communication with a hydrogen supply (not shown), is also passed through the smoke flue of the furnace, as shown, running the whole length of the flue, for conveying hydrogen to the vaporizers which is done by means of pipes $h$, or to the retorts direct if preferred, as shown in dotted lines. The hydrogen thus becomes superheated and therefore better prepared to mingle with the vapor of hydrocarbon and not detract from the heat thereof.

The admission of hydrogen into the vaporizer or retort, is governed by valves of ordinary construction, and by its union with the hydrocarbon vapor, gas of any desired candle power can be uniformly produced and maintained. As fast as vapor is formed from the hydrocarbon it becomes mixed with hydrogen, as shown, and the mixture is allowed to escape through pipe 14, which communicates with the vaporizer as shown in Figs. 1, and 2, and by which it is conveyed into the inner flue or pipe 15, of the retort 16, located within the furnace. This inner flue or pipe 15, is in fact an extension of pipe 14, and is hung in position by means of a flange or other suitable device preferably in the center and upper part of the interior of the retort 16, and extends nearly the entire length of said retort, and being open at the lower end allows the vaporous mixture above described to flow freely into said retort, returning upward through its interior 17, and in its passage down and up, being heated to a high temperature, it is converted into fixed gas and emerges through pipe 18, and valve 19, into the seal box 20, whence it is conveyed through pipe 21, to the gas main 3. Thence it is conveyed to the scrubbers, purifiers, &c., such as are in ordinary use. The flue or pipe 15, can be easily removed whenever desirable, and the hydrogen pipe $h$, may be put in communication with the vaporizer 8, or with the top of the pipe 15, as shown in dotted lines, or if preferred, it might communicate with pipe 14, and produce substantially the same result.

The seal box 20, in communication with pipes 18, and 21, acts as a hydraulic main and is supplied with water by pipe 22, from any desired source. The water overflows from this box into pipe 23, by which it is conveyed to the retort seal 24, see Fig. 1$^a$, and passing through said retort seal it is discharged through pipe 25, into the seal tank 26. The opening 27, into the retort seal 24, is for admitting additional water if necessary for flushing or other purposes, and all water can be drawn off if desired, through pipe 28, also connecting with seal tank 26.

The seal pipe, or retort seal 24, runs, as shown, longitudinally through the lower part or foundation of the furnace, from end to end of the same, and contains as many flanged openings as there are retorts in the line. The ends of the retorts extend preferably, about half way to the bottom of the retort seal 24, and each retort is supported by a flange corresponding in size and shape with that on the retort seal.

By reference to the drawings it will be seen that each retort is independent of every other one, having its own separate vaporizer and seal box; so that the use of one or more retorts can be discontinued temporarily or permanently by simply closing valve 19, and the valves admitting hydrocarbon and hydrogen to the vaporizer. This can be done while the rest are in full operation. It will also be seen that the number of retorts in a furnace is optional, as well as the size, shape and position of the same. Preferably they should be placed in rows as shown, with at least two rows in a furnace. They should be within a short distance of each other longitudinally; while laterally they should be sufficiently far apart to allow for fires capable for giving the heat required to heat the retorts properly and economically. If for any reason it is desirable to vaporize the hydrocarbon so as to have only thick tar as a residual, instead of unvaporized oil to be used as a fuel, a valve can be placed in the pipe 13, which will compel all the unvaporized hydrocarbon to pass out of the vaporizer with the mixture of vapor and hydrogen and follow the same to the bottom of the pipe or flue 15, when it will fall into the retort seal 24, and be carried to the seal tank 26, as shown. In case this method is adopted and tar or carbon should adhere to either the pipe 15, or retort 16, flue cleaners 32, and 33, are so constructed and arranged in the upper ends of said pipes and retorts as to be operated mechanically by rods 34, and 35, without in any way stopping or retarding the production of gas.

The inclosing walls of the furnace are preferably provided with air chambers or passages 29, on top and sides through which air can be allowed to flow and become heated for purposes of combustion. The products of combustion escape through flues 31, as shown, and are thence conducted through pipes 10, to smoke flue 2, as shown. The longitudinal smoke flues of the furnace are connected with a suitable stack, not shown, as also are the smoke pipes or flues 2,—and dampers are placed in all the flues at suitable points to regulate the draft, in the usual manner, and dampers are also placed in pipes 10, to assist in governing the heat of vaporizers.

Among the many advantages of this form of construction are, the use of vertical or inclined pipes or retorts, vertical preferably; and the consequent saving of space and compactness of apparatus; the sealing of the retorts at the lower end and the means for cleaning the same; the arrangement of the pipe or secondary retort 15, within the main retort and whereby the hydrocarbon vapor, or vapor and hydrogen is compelled to pass to the bottom of the retort, thus giving a better opportunity for the vapor to become highly heated and for the vapor and hydrogen to become thoroughly mixed and converted into a fixed gas; the use of the smoke flue instead of the main furnace for heating the steam and hydrogen, though this does not preclude the heating of either within the furnace; the use of the smoke flue or the main gas line to heat the hydrocarbon before being admitted to the vaporizer; the admission of hydrogen either to the vaporize or retort, and the compelling of the hydrocarbon not vaporized to pass into the inner pipe or retort if desired.

It will be seen from the foregoing description, that the apparatus is so constructed as to permit the heating of the retorts to any desired temperature, in any desired manner, either by coal, coke, gas or hydrocarbons; and that each retort is so arranged as to be operated successfully, either separately, or in combination with any other one, or number of those in the bench. It will also be seen that each retort, taken as a whole, consists of an outer or an inner pipe, designated on the drawings by the numerals 15 and 16, the outer pipe being supported by a flange near the lower end thereof, which rests on a corresponding flange of a pipe or box below, called the retort seal, see Fig. 1ª, while the lower end of this pipe passes into said seal sufficiently to effectually seal it off from each of the other retorts by means of water admitted to said retort seal. The inner pipe of the retort, is connected near the upper end with its inclosing pipe, and extends downward to a predetermined distance near the bottom of the outer pipe, the upper end of the outer pipe, being connected with a seal box 20, as hereinbefore described, and this seal box 20, being connected with the main output pipe which conveys the gas from the several retorts to the coolers. This seal box 20, answers the purpose of a hydraulic main and water supplied thereto, escapes into the retort seal box below the retort.

The operation of this apparatus, is as follows: Having heated the retort to the proper temperature, the hydrocarbon preferably in liquid form, is admitted to the vaporizer 9, where it is converted into vapor, either entirely or partially, from which it passes preferably into the inner pipe of the retort, and descends through said pipe and is discharged therefrom at its open lower end, from which point it passes up through the larger pipe and off through the seal box 20, as described. The hydrocarbon or vapor thereof, is thus subjected to a constant increasing heat from the time it enters the top of the inner pipe 15, until it leaves the top of the outer pipe, which results in converting it into a perfectly fixed gas. In order to make a merchantable, illuminating and heating gas by the hydrocarbon thus treated, hydrogen or more correctly speaking, water-gas, previously made for the purpose, is introduced with the hydrocarbon and is thoroughly mixed therewith, and unites with the same and forms a fixed gas of great purity. By this admission of hydrogen or water-gas, any candle power desired can be easily and uniformly maintained, while a continuous yield is produced. A slight vacuum is maintained in the retorts by means of an exhauster, not shown, which at the same time drives the gas through the coolers, scrubbers, &c., to the holders as is done in connection with other gas apparatus. Any foreign matter or unvaporized portion of hydrocarbon which being admitted to the retort cannot be converted into a fixed gas is precipitated into the retort seal, and is carried away by the water constantly flowing through said seal; and should any portion of such unvaporized matter adhere to either pipe of the retort, the flue scrapers or cleaners, hereinbefore described, are so arranged as to remove the same, and not interrupt the operation of the apparatus. It will also be seen that the head, or the upper end of the larger or outer pipe of the retort, and the inner pipe thereof, aid materially in vaporizing the liquid hydrocarbons, if the same are, or should, be admitted thereto in liquid form, before they are passed out into, and up through, the outer retort pipe.

Of course, the vaporizer herein shown and described is not essential to the operation of this apparatus. Any form of vaporizer may be used, or the hydrocarbon, if desired, may be admitted directly, from any source, into the upper end of the inner retort pipe.

The retorts can be made of any desired material, refractory material preferred, and the mode of heating the same may be whatever the operator desires, but preferably I would use a brick or tile burner, like or similar to that for forming gas from hydrocarbon and burning the same in a furnace, for which United States Letters Patent were granted to me March 22, 1892, No. 471,275, and in case the furnaces are of such height or size as to cause difficulty in keeping them at the proper temperature, another or auxiliary burner could be placed in the walls of the fire chamber, half way up, more or less, and supplied with the requisite air for combustion from the air flues in the said walls.

It is evident that many changes and modifications in the construction, arrangement and combination of the various parts of the apparatus may be made without departing from the scope of my invention and I do not limit myself to the exact form shown; but, Having fully described my invention, its construction and operation, I claim, and desire to secure by Letters Patent, the following:

1. In an apparatus for producing gas from hydrocarbons, the combination with a furnace, of a retort closed at the top and open at the bottom and arranged vertically within said furnace, a vaporizer in communication with the retort at the top thereof, means for delivering the vaporized hydrocarbon into the retort near its lower end, means for conducting off the fixed gas near the upper end of the retort, and a water seal for preventing the escape of gas from the bottom of said retort, substantially as described.

2. In an apparatus for producing gas from hydrocarbons, the combination with a furnace, of a retort closed at the top, open at the bottom, and arranged vertically within said furnace, a vaporizer in communication with the top thereof, means for delivering the vaporized hydrocarbon into the retort near its lower end, means for conducting off the fixed gas near the upper end of the retort, a water seal for preventing the escape of gas from the bottom of said retort, and a cleaner within the retort operated from the top thereof, substantially as described.

3. In an apparatus for producing gas from hydrocarbons, the combination with a furnace of a retort closed at the top and open at the bottom and arranged vertically within said retort, a water seal for preventing the escape of gas at the bottom of the retort, a pipe arranged within the retort, the bottom of which is open, and a vaporizer in communication with the pipe, substantially as shown and described.

4. In an apparatus for producing gas from hydrocarbons, the combination with a furnace of a retort closed at the top and open at the bottom and arranged vertically within said furnace, a water seal for preventing the escape of gas from the bottom thereof, a pipe within the retort, one end of which is open, a vaporizer in communication with the closed end of the pipe and cleaners within the retort and pipe, operated substantially as shown and described.

5. In an apparatus for producing gas from hydrocarbons, the combination with a furnace, of a retort closed at the top and open at the bottom and arranged vertically within said furnace, a water seal for preventing the escape of gas from the lower end of said retort, a vaporizer in communication with the upper end and a water seal as 20, also in communication with the retort, substantially as shown and described.

6. In an apparatus for producing gas from hydrocarbons, the combination with a furnace of a retort closed at the top and open at the bottom and arranged vertically within said furnace, a water seal for preventing the escape of gas from the lower end of said retort, a vaporizer in communication with the top thereof, and a hydrogen supply pipe located in the smoke flue of the furnace and communicating with the vaporizer, substantially as shown and described.

7. In an apparatus for producing gas from hydrocarbons, the combination with a furnace of a retort closed at the top and open at the bottom and arranged vertically within said furnace, a water seal for preventing the escape of gas from said retort, a vaporizer in communication with the top thereof, and a pipe provided with a valve, communicating with the bottom of the vaporizer, whereby the hydrocarbon not vaporized may be forced, or caused to flow, into the retort, substantially as shown and described.

8. In an apparatus for producing gas from hydrocarbons, the combination with a furnace of a retort closed at the top and open at the bottom and arranged vertically within said furnace, a water seal for preventing the escape of gas from the bottom of said retort, a vaporizer in communication with the top of the retort, a pipe provided with a valve communicating with the bottom of the vaporizer and with the retort, whereby the unvaporized hydrocarbon may be caused to flow into the retort, and cleaners for the retort, substantially as shown and described.

9. In an apparatus for producing gas from hydrocarbons, the combination with a furnace, of a retort closed at the top and open at the bottom and arranged vertically within said furnace, a water seal for preventing the escape of gas from the bottom of said retort, a pipe as 15, within the retort, a vaporizer in communication with said pipe, a pipe as 13, provided with a valve in communication with the bottom of the vaporizer, whereby the unvaporized hydrocarbon may be caused to flow into the retort and cleaners for the retort and pipe therein, substantially as shown and described.

10. In an apparatus for producing gas from hydrocarbons, the combination with a furnace of a retort closed at the top and open at the bottom and arranged within said furnace, a water seal for preventing the escape of gas from the bottom of said retort, a vaporizer in communication with the retort, a steam coil within the vaporizer and a steam pipe within the smoke flue of the furnace in communication with the coil within the vaporizer, substantially as shown and described.

11. In an apparatus for producing gas from hydrocarbons, the combination with a furnace of a retort closed at the top and open at the bottom and arranged vertically within said furnace, a water seal for preventing the escape of gas from the bottom of said retort, a vaporizer in communication with the retort, a smoke pipe in communication with the escape flue of the furnace, a main gas main in communication with the retort, and a hydrocarbon supply pipe passing through either said smoke pipe or gas main and communicating with the vaporizer, substantially as shown and described.

12. In an apparatus for producing gas from hydrocarbons, the combination with a furnace of a retort closed at the top and open at the bottom and arranged vertically within said furnace, a water seal for preventing the escape of gas from the bottom of said retort a vaporizer in communication with the top of the retort, and a water seal 20, in communication with the top of the retort, said seals being in communication by means of a pipe as 23, substantially as shown and described.

13. In an apparatus for producing gas from hydrocarbons, the combination with a furnace of a series of retorts closed at the top and open at the bottom and arranged vertically within said furnace, water seals for preventing the escape of gas from the bottom of said retorts, a vaporizer for each retort in communication therewith, a seal and valve interposed between each retort and its vaporizer, and a separate hydrocarbon supply for each vaporizer, whereby the use of one or more of the retorts may be discontinued, temporarily, or permanently by closing the said valve, substantially as shown and described.

14. In an apparatus for producing gas from hydrocarbons and hydrogen, the combination, with a furnace, of a series of retorts closed at the top and open at the bottom, and arranged vertically within said furnace, water-seals for preventing the escape of gas from the bottom of said retorts, a separate vaporizer for each retort, in communication therewith by means of a pipe, a water-seal and a valve, interposed between each retort and its vaporizer, and separate hydrocarbon and hydrogen supply pipes provided with valves communicating with each vaporizer, whereby the operation of any retort may be discontinued without affecting the operation of the other retort, substantially as described.

15. In an apparatus for producing gas from hydrocarbons, the combination with a furnace, of a retort closed at the top and open at the bottom and arranged vertically within said furnace, a water seal for preventing the escape of gas from the bottom of said retort, a pipe arranged within said retort, the lower end of which is open, and a vaporizer in connection with said pipe, substantially as shown and described.

Signed at Saratoga Springs, in the county of Saratoga and State of New York, this 2d day of November, A. D. 1892.

JAMES S. ROGERS.

Witnesses:
L. E. CARMAN,
CHAS. WIRTH.

It is hereby certified that in Letters Patent No. 506,730, granted October 17, 1893, upon the application of James S. Rogers, of Saratoga Springs, New York, for an improvement in "Apparatus for Producing Gas from Hydrocarbon Liquids," an error appears in the printed specification requiring the following correction, viz: On page 4, line 51, the word "retort" should read *furnace;* and that the said Letters Patent should be read with this correction therein that the same may conform to the record of the case in the Patent Office.

Signed, countersigned, and sealed this 16th day of January, A. D. 1894.

[SEAL.]

JNO. M. REYNOLDS,
*Assistant Secretary of the Interior.*

Countersigned:
    JOHN S. SEYMOUR,
        *Commissioner of Patents.*